April 2, 1929.  E. S. MIX  1,707,562
BELT FOR PERSONAL WEAR
Filed Dec. 5, 1927   2 Sheets-Sheet 1
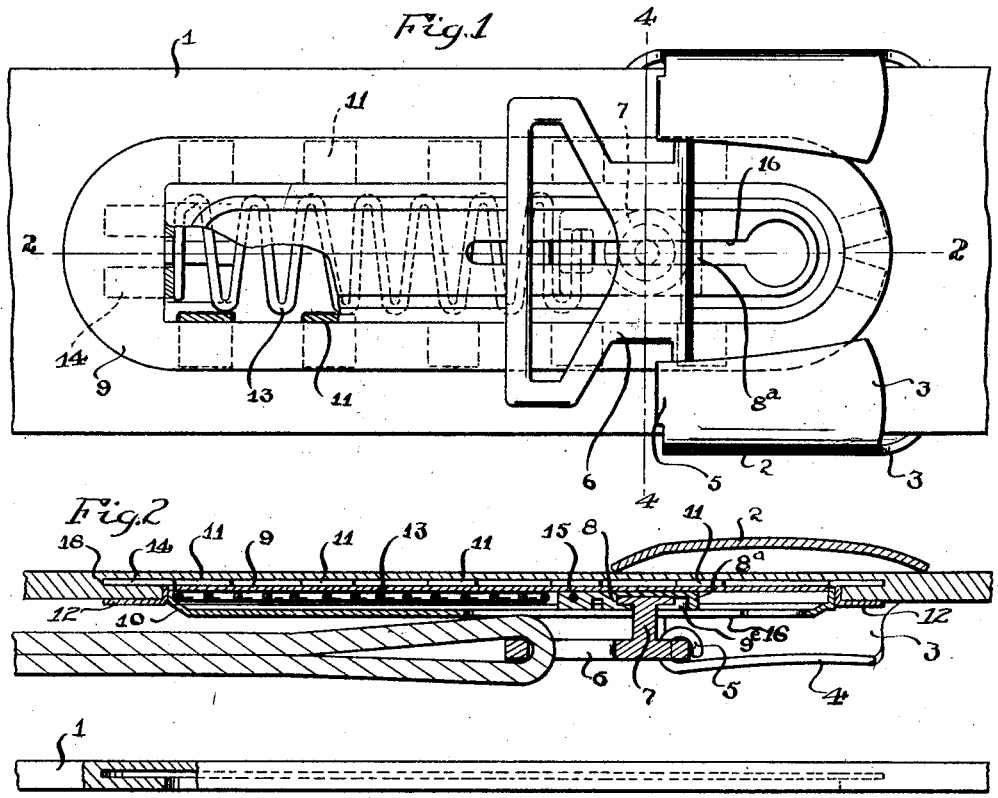
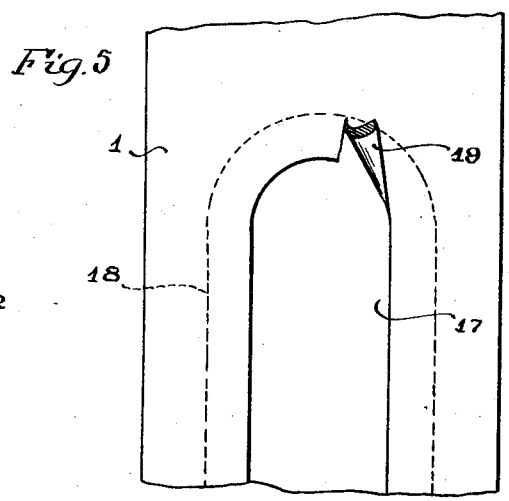
INVENTOR
Edwin S. Mix
BY
his ATTORNEY April 2, 1929.  E. S. MIX  1,707,562
BELT FOR PERSONAL WEAR
Filed Dec. 5, 1927    2 Sheets-Sheet 2
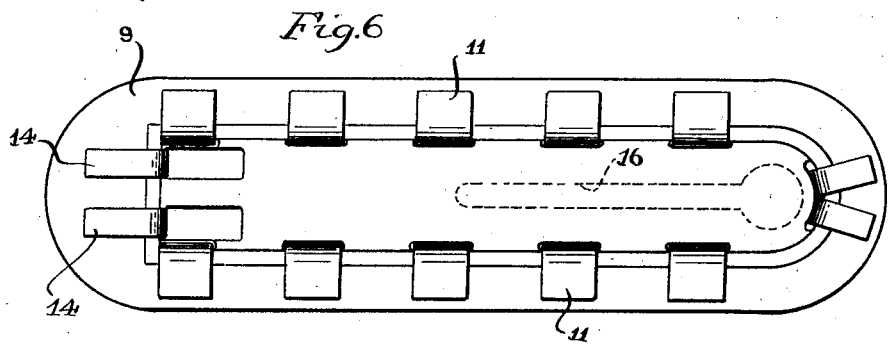
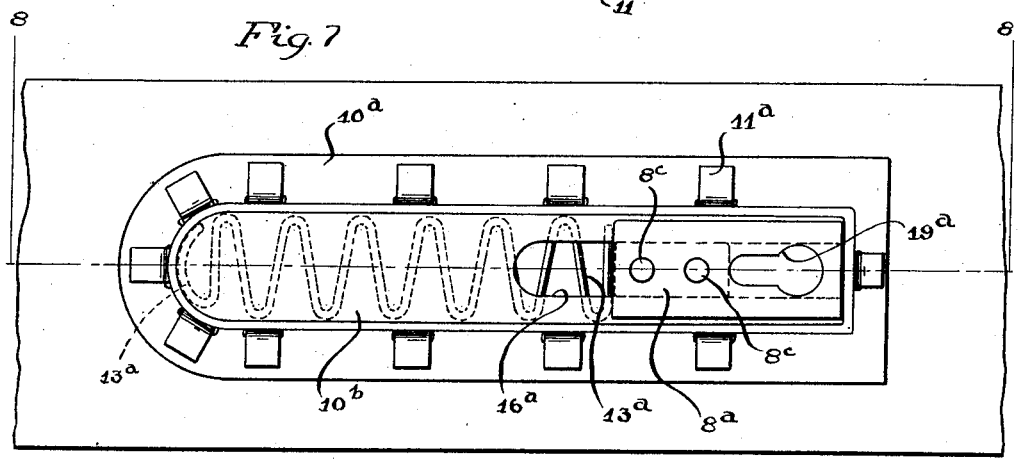
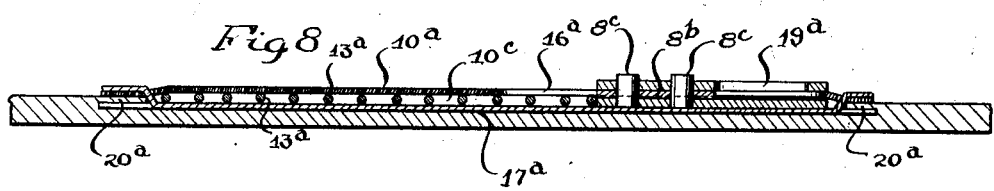
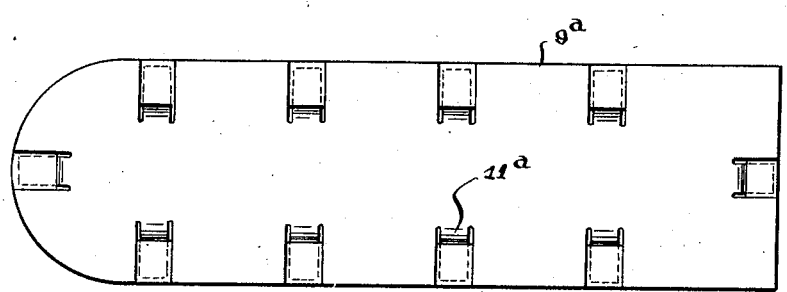
INVENTOR
Edwin S. Mix
BY
his ATTORNEY Patented Apr. 2, 1929.

1,707,562

UNITED STATES PATENT OFFICE.

EDWIN S. MIX, OF ROCHESTER, NEW YORK, ASSIGNOR TO HICKOK MANUFACTURING COMPANY, INC., OF ROCHESTER, NEW YORK, A CORPORATION OF NEW YORK.

BELT FOR PERSONAL WEAR.

Application filed December 5, 1927. Serial No. 237,650.

The present invention relates to a belt for personal wear and more particularly to the type in which elastic means is provided which permits the expansion and contraction on the belt. An object of this invention is to provide a means which may be readily secured to the inner face of a belt for resiliently supporting an anchoring device for engagement with anchoring means on the opposite end of the belt. Another object of the invention is to provide for a resiliently mounted anchoring device, a support which may be attached to the inner face of the belt without marring or disfiguring the outer face of the belt.

To these and other ends, the invention consists of certain parts and combinations of parts all of which will be hereinafter described: the novel features being pointed out in the appended claims.

In the drawings:

Fig. 1 is a rear view of a fragment of a belt with parts in section illustrating one embodiment of the invention;

Fig. 2 is a section on the line 2—2, Fig. 1;

Fig. 3 is a fragmentary view partially in section with the support for the anchoring device removed;

Fig. 4 is a section on the line 4—4, Fig. 1;

Fig. 5 is a fragmentary view on the inner face of the belt;

Fig. 6 is a rear view of the support for the anchoring device;

Fig. 7 is a fragmentary view of the inner face of the belt showing another embodiment of the invention;

Fig. 8 is a section on the line 8—8, Fig. 7; and

Fig. 9 is a rear face view of the embodiment illustrated in Figs. 7 and 8.

In the embodiment of the invention illustrated in Figs. 1 to 6, the belt 1 has one end secured to an anchoring device on a buckle frame 2, this buckle frame having side flanges 3 with inwardly turned portions 4 provided with bearings 5 on which a swinging anchoring member turns, this anchoring member being in the form of a loop about which a belt end is passed as shown in Fig. 2. The swinging anchoring member 6, in this instance, carries another anchoring device 7, preferably in the form of a headed projection 7 adapted to cooperate with anchoring means arranged on the inner face of the belt adjacent the free end of the latter.

The anchoring means on the inner face of the belt, in this embodiment, comprises a slidable anchoring device or member 8 having a projecting portion 8$^a$ with a bayonet slot 9$^e$ formed therein for the reception of the headed projection or anchoring device 7. This slidable anchoring device 8 is preferably guided for a straight line movement on a supporting frame attached to the inner face of the belt. In this instance, this supporting frame comprises two plates 9 and 10, the latter being cupped or channeled and having prongs 11 at its edges extended through the plate 9 and thence outwardly. The plate 9 is larger in area than the plate 10 so that it projects at 12 beyond the housing or chamber formed between the two members thereby providing a surrounding flange. Within the housing or chamber, the slide 8 moves and is guided. Also arranged in this chamber is a flat zig-zag spring 13, having one end secured by fingers 14 at one end of the chamber while the opposite end is soldered or otherwise secured at 15 to the slide or anchoring member 8. The outer wall of the chamber or plate 10 is formed with a bayonet slot 16, which has its narrow portion longer than the bayonet portion of the slot of the slide or member 8. With the end of securing the support for the slidable anchoring member to the inner face of the belt 1, the latter is provided with an elongated pocket 17 on the inner face thereof near the free end of the belt and the side walls of these pockets are undercut at 18 to provide overhanging portions or flanges 19. The flange 12 on the housing abuts the outer face of these overhanging portions 19 while the lugs or tongues 11 extend beneath the overhanging portions 19. The flange and the lugs being pressed together so that the overhanging portions 19 are gripped between them and the support for the slidable anchoring device 8 is held to the inner face of the belt.

In using the belt, one end thereof is passed through the loop 6 and is secured thereto in any suitable manner. The other end is passed in rear of the front plate 2 and in front of the inwardly turned portions 4 of guide flanges, the head of the projection 7 being engaged in the bayonet slot of the anchoring member 8, as illustrated in Fig. 2 of the drawings. The anchoring member 8 moves in the guide chamber against the action of the spring 13, the neck portion of the head of the projection 7 operating in the slot 16 of the guide chamber.

In the embodiment shown in Figs. 7, 8 and 9, a slightly different construction of the anchoring member near the free end of the belt 1 is illustrated. In this illustrated construction, the supporting frame embodies two plates 9ª and 10ª. The plate 9ª has tongues 11ª pressed forwardly therefrom while the plate 10ª has slots spaced from its edges and through which the tongues 11ª are passed to cooperate with the outer face of the plate 10ª. The latter has an elongated pressed up portion 10ᵇ spaced from the edge of the plate and forming a chamber 10ᶜ for a zig-zag spring 13ª, one end of which abuts one end of the chamber while the opposite end is soldered or otherwise secured to the slidable anchoring device 8ª. The anchoring device is formed of two plates held together in spaced relation by a spacing plate 8ᵇ, rivets 8ᶜ being passed through the two main plates and a spacing plate 8ᵇ. The spacing plate 8ᵇ is narrower than the two main plates of the anchoring device so that portions on opposite sides of a slot 16ª in the plate 10ª may be received between the two main plates of the anchoring device 8ª. The anchoring device 8ª has in its outer plate, a bayonet slot 19ª cooperating with the headed projection 7 on the buckle frame illustrated in Fig. 2. The edges of the two plates 9ª and 10ª are spaced apart so as to receive between them an overhanging portion 20ª, surrounding the pocket 17ª formed in the inner face of the belt 1 adjacent the end of the latter.

This embodiment of the invention as before stated, may be used with a buckle frame similar to that illustrated in the other embodiment of the invention. The headed projection 7 is received in the bayonet slot 19ª and the belt expands or contracts with a movement of the anchoring member 8ª on the supporting frame, the movement of the anchoring member being resisted in one direction by the spring 13ª and assisted in the other direction by said spring.

From the foregoing, it will be seen that there has been provided a belt for personal wear in which a support is arranged on the inner face of the belt, preferably in a pocket with overhanging walls with which the support engages to hold said support in the pocket. The support contains a chamber in which is arranged spring means, and on this support is guided an anchoring member which is exposed through a slot in the support for engagement with an anchoring member supported on the opposite end of the belt. There has also been provided a construction in which the anchoring member is arranged on the opposite end of the belt adjacent one end thereof for engagement by an anchoring device which is supported on a swinging member to which the other end of the belt is secured, the swinging member being mounted on a buckle frame through which the first mentioned end of the belt is guided and the swinging member being situated in the rear of that portion of the belt guided on the buckle frame so that the free belt end may be passed in front of the swinging member to overlap that end of the belt secured to the swinging member.

What I claim as my invention and desire to secure by Letters Patent is:

1. In combination with a belt for personal wear having a pocket formed in the inner face thereof, near one end, a support arranged in said pocket and provided with a chamber and an elongated slot, spring means arranged in the chamber, an anchoring device guided on the chamber exposed through the slot and having its movement opposed to the spring means, and an anchoring device carried by the opposite end of the belt and detachably connected with the anchoring device guided by the chamber.

2. In combination with a belt for personal wear having a pocket in the inner face thereof adjacent one end of the belt, said pocket having overhanging guide walls, a support arranged in the pocket and secured to the overhanging side walls, said support forming a chamber, spring means arranged in the chamber, an anchoring device guided on the support and having its movement opposed to the spring means, and an anchoring device carried by the opposite end of the belt and detachably connected with the anchoring device guided by the support.

3. In combination with a belt for personal wear, a support secured to the inner face of the belt adjacent to one end of the latter and provided with a chamber and an elongated slot, spring means arranged in the chamber, an anchoring device guided on the support and having its movement opposed by the spring means, said anchoring device being exposed through the slot in the support, and an anchoring device carried by the opposite end of the belt and detachably connected with the anchoring device guided by the support.

4. In combination with a belt for personal wear having a pocket in the inner face thereof adjacent one end of the belt formed with overhanging side walls, a support arranged in the pocket and secured to said overhanging side walls to hold the support in the pocket, an anchoring device carried by said support, and an anchoring device arranged adjacent the opposite end of the belt and detachably connected with the anchoring device on the support.

5. In combination with a belt for personal wear having a pocket on the inner face thereof adjacent one end of the belt, the said pocket having overhanging side walls, two supporting plates forming a chamber between them and each having portions beyond the chamber engaging with opposite sides of the overhanging side walls of the pocket, an anchoring device mounted on said supporting plates, a spring arranged in the chamber and opposing the movement of the anchoring device in one direction, and an anchoring device on the opposite end of the belt detachably connected with the anchoring device on the chamber.

6. In combination with a belt for personal wear, an anchoring member, means supporting the anchoring member for a sliding movement on the inner face of the belt adjacent one end of the latter, spring means opposing said movement, a buckle frame in which the before mentioned end of the belt is guided, and a swinging member mounted on the buckle frame and having two anchoring devices thereon, one having detachable engagement with the anchoring device on the inner face of the belt and the other having the other end of the belt secured thereto.

7. In combination with a belt for personal wear, an anchoring device having a bayonet slot formed therein, a means supporting said device for sliding movement on the inner face of the belt adjacent one end of the latter, spring means opposing the movement of the anchoring member, a buckle frame through which the said end of the belt is guided, and a swinging member on the buckle frame having a loop to which the other end of the belt is secured, and having a headed projection for insertion in the bayonet slot in the first metioned anchoring member.

8. In combination with a belt for personal wear of a chambered support secured to the belt on the inner face of the latter adjacent one end thereof, the chamber having an opening at that end thereof opposite the adjacent end of the belt, spring means arranged in the chamber of said support, and connecting means between the spring means and the other end of the belt extending through said opening in the chamber.

9. The combination with a buckle frame having side flanges, a belt and means for securing one end of the belt to the buckle frame so that the other end may pass between the side flanges and overlap the secured end, of spring means secured on the inner face of the overlapping end, a longitudinally extending guide also arranged on the overlapping end of the belt, and an anchoring means mounted on the buckle frame having a detachable connection with the guide and movable on the latter in cooperation with the spring means.

EDWIN S. MIX.